US007016173B2

(12) United States Patent
Lee

(10) Patent No.: US 7,016,173 B2
(45) Date of Patent: Mar. 21, 2006

(54) DEVICE FOR DETECTING AND PROTECTING POWER CONNECTIONS AND METHOD THEREOF

(75) Inventor: Chun-Liang Lee, Taipei (TW)

(73) Assignee: Inventec Corporation, Taipei (TW)

( * ) Notice: Subject to any disclaimer, the term of this patent is extended or adjusted under 35 U.S.C. 154(b) by 354 days.

(21) Appl. No.: 10/409,146

(22) Filed: Apr. 9, 2003

(65) Prior Publication Data

US 2004/0201932 A1    Oct. 14, 2004

(51) Int. Cl.
*H02H 3/20* (2006.01)
(52) U.S. Cl. ........................................................ 361/90
(58) Field of Classification Search ................. 361/90
See application file for complete search history.

(56) References Cited

U.S. PATENT DOCUMENTS

| | | | | |
|---|---|---|---|---|
| 5,414,344 A | * | 5/1995 | Chinn | ........................ 324/72 |
| 5,497,284 A | * | 3/1996 | Le Van Suu | .................. 361/42 |
| 5,554,049 A | * | 9/1996 | Reynolds | ..................... 439/490 |
| 5,664,119 A | * | 9/1997 | Jeffries et al. | .............. 710/302 |
| 5,909,181 A | * | 6/1999 | Golzmane | .................... 340/649 |
| 6,204,637 B1 | * | 3/2001 | Rengan | ....................... 320/137 |
| 6,321,277 B1 | * | 11/2001 | Andresen et al. | ............. 710/8 |
| 6,675,242 B1 | * | 1/2004 | Benson et al. | ............. 710/104 |
| 6,889,281 B1 | * | 5/2005 | Burns et al. | ................ 710/301 |

* cited by examiner

*Primary Examiner*—Brian Sircus
*Assistant Examiner*—James A Demakis
(74) *Attorney, Agent, or Firm*—Birch, Stewart, Kolasch & Birch, LLP

(57) ABSTRACT

A device and method of detecting and protecting the power connections of a data processing system. The object of the invention is to determine the status of the power connections between each sub-system and the data processing system and protect the system when any of the power connections are not complete. If any of the sub-systems or interfaces have incomplete working power connections, then the protection device locks the working power source and protects the data processing system.

4 Claims, 3 Drawing Sheets

DEVICE FOR DETECTING AND PROTECTING POWER CONNECTIONS AND METHOD THEREOF

BACKGROUND OF THE INVENTION

1. Field of Invention

The invention relates to data processing systems, and particularly to devices and methods for detecting and protecting power connections that are capable of displaying detection results.

2. Related Art

As data processing technology advances, the opportunity for using electronic devices also increases. From national governments and large corporations, to family and personal uses, people rely on data processing devices more heavily than ever. To increase efficiency at work and while doing research, everyone uses data processing systems.

To handle large workloads, data processing systems usually have several sub-systems. These sub-systems include all kinds of peripheral interfaces to assist data processing systems in accomplishing various tasks. However, if the system is too large, it makes maintenance very difficult. When the data processing system is being booted, if any of the subsystems are not connected to the power sources completely, the data processing system may lose some of its functionality. This might even result in damage to the system of the main servers and/or the sub-systems.

If the above defection occurs in the system, the repairing procedure is even more complicated. Due to the large number of sub-systems, it is difficult to determine the location of incomplete power connection and repair is delayed. Therefore, to detect the condition of the power connections between the data processing system and sub-systems and simplify the process of fixing power related problems is a major technical challenge.

SUMMARY OF THE INVENTION

The invention provides a device for and method of detecting and protecting the power connections of a data processing system. Its purpose is to determine the status of the power connections between each sub-systems and the data processing system and protect the system when any of the power connections are not complete. The invention includes the method of detection and the device for protection. The method for detection is used to detect the working power connection between the data processing system and each sub-system and interface, and then display the results. If any of the sub-systems or interfaces has an incomplete working power connection, then the protection device locks the working power source and protects the data processing system.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
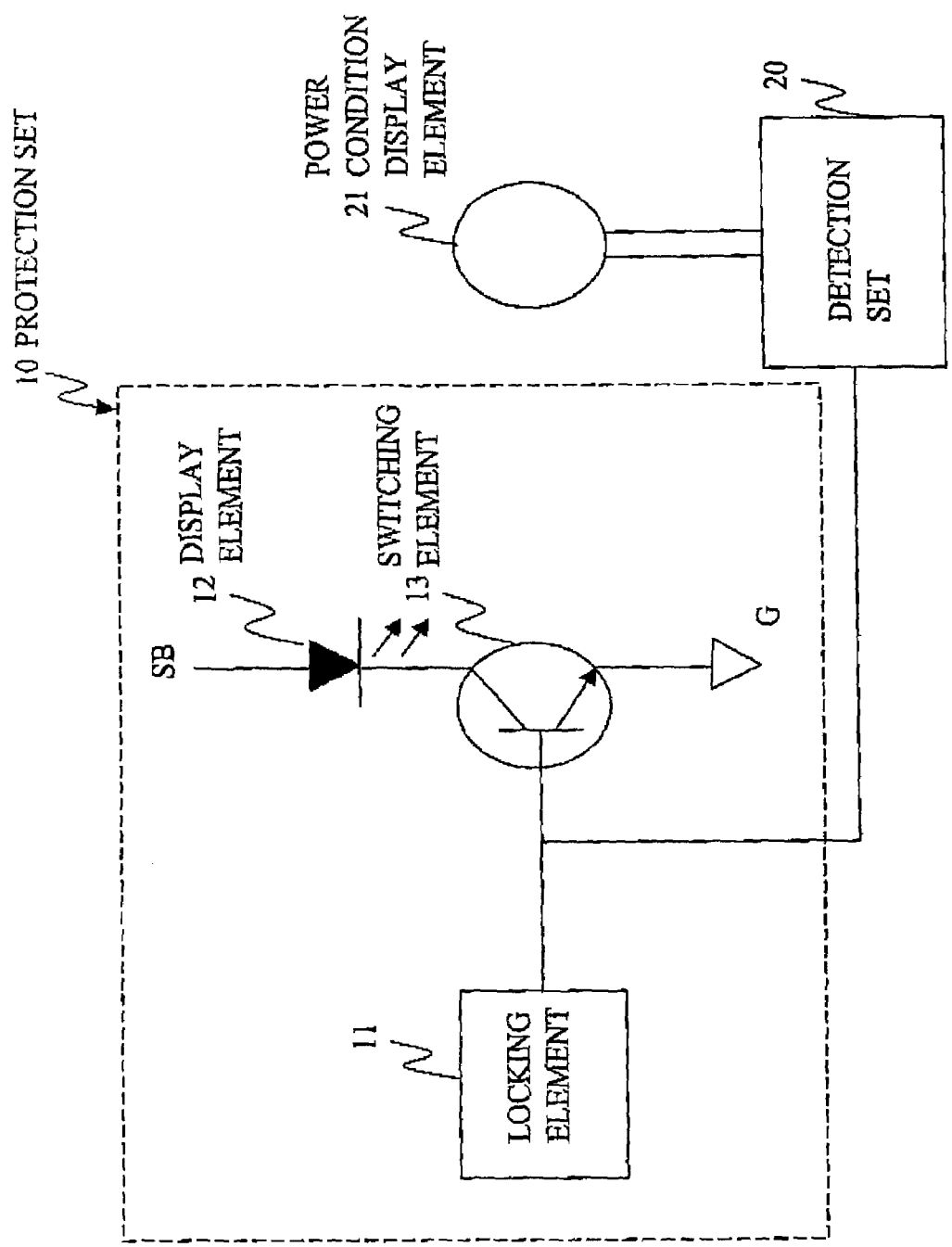
FIG. 1 illustrates, in block diagram form, a device for detecting and protecting the power connection of a data processing system.

The invention is a device and method for detecting and protecting the power connections of a data processing system. Please refer to FIG. 1 for the block diagram of the physical layout of the invention.

The device of the invention, which detects and protects the power connection conditions, is located within a data processing system. When a user turns on the power of the data processing system, the invention determines the status of the power connections of the main processing system, each sub-system and all interfaces. The device includes: a protection set (10) and detection set (20). The protection set (10) is capable of incorporating multiple sets, which depends on the number of sub-systems. The protection set(s) is/are connected to the sub-system(s) and display(s) the condition of the connection between all sub-systems and interfaces with the power source of the data processing system. When an error occurs with the power connection, the working power is locked to prevent any possible damage caused by powering up the system while the power connection is incomplete.

The protection set (10) includes: a locking element (11), display element (12), and switching element (13). The display element (12) is an LED (light emitting diode) and is connected to the stand-by power (SB). When the power connections between the data processing system and the sub-systems are incomplete, the stand by power is transferred from the display element (12) to the ground (G), and the display element (12) lights up to indicate the abnormality. The locking element (11) is a PLC (programmable logic controller), which is used to control the working power. When the connections between the data processing system and the sub-systems are normal, a switching signal is transmitted to the switching element (13). The switching element (13) is a transistor, which is connected to locking element (11) and display element (12). When the switching element (13) receives the switching signal, it switches and turns off the display element (12).

The detecting set (20) is connected to the protection set (10) and is used to detect the condition of the protection set (10). When the power connections of the sub-systems are normal, the switching signal is produced by the locking element (11). When all power connections are normal, the data processing system can be started safely, and the system condition is displayed on the power condition display element (21).

Figure 2:
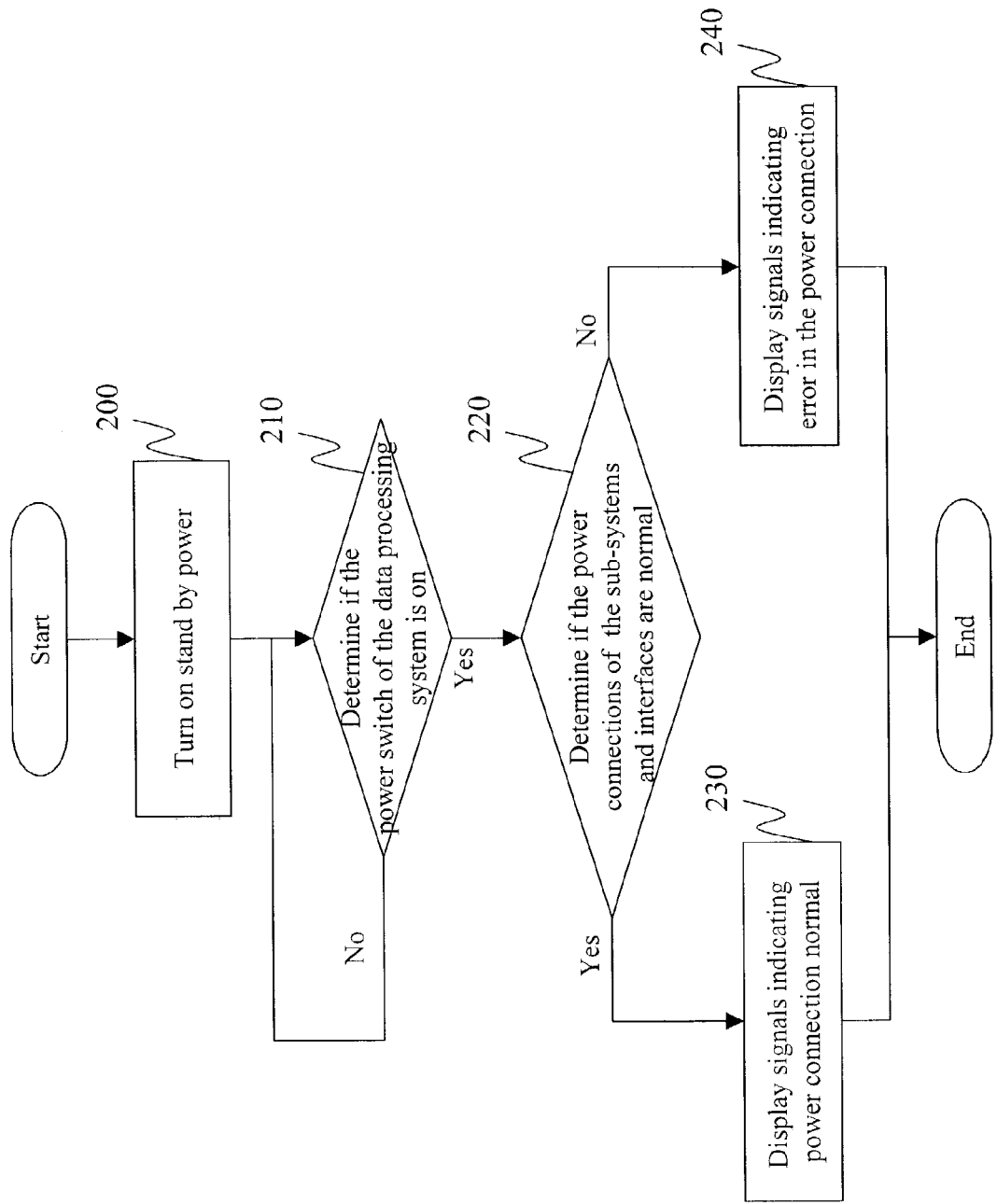
FIG. 2 illustrates, in flow diagram from, the method of detecting and protecting the power connection.

Please refer to FIG. 2 for a flow chart that illustrates the process of detecting and protecting the power connection conditions.

The invention is capable of both detecting and protecting the power connection condition. The device first turns on the stand-by power (step 200), and then uses the detecting set (20) to determine whether the data processing system's power switch is in the on position (step 210). If the power switch is not turned on, the detecting set continues to monitor the switch. If the power switch is turned on, then the detecting set detects whether the power connections between each sub-system and interface are normal (step 220). If the connections are normal, then the power condition display element (21) displays a normal connection signal (step 230). If the connections are not all normal, then the power condition display element (21) displays an error signal (step 240).

Figure 3:
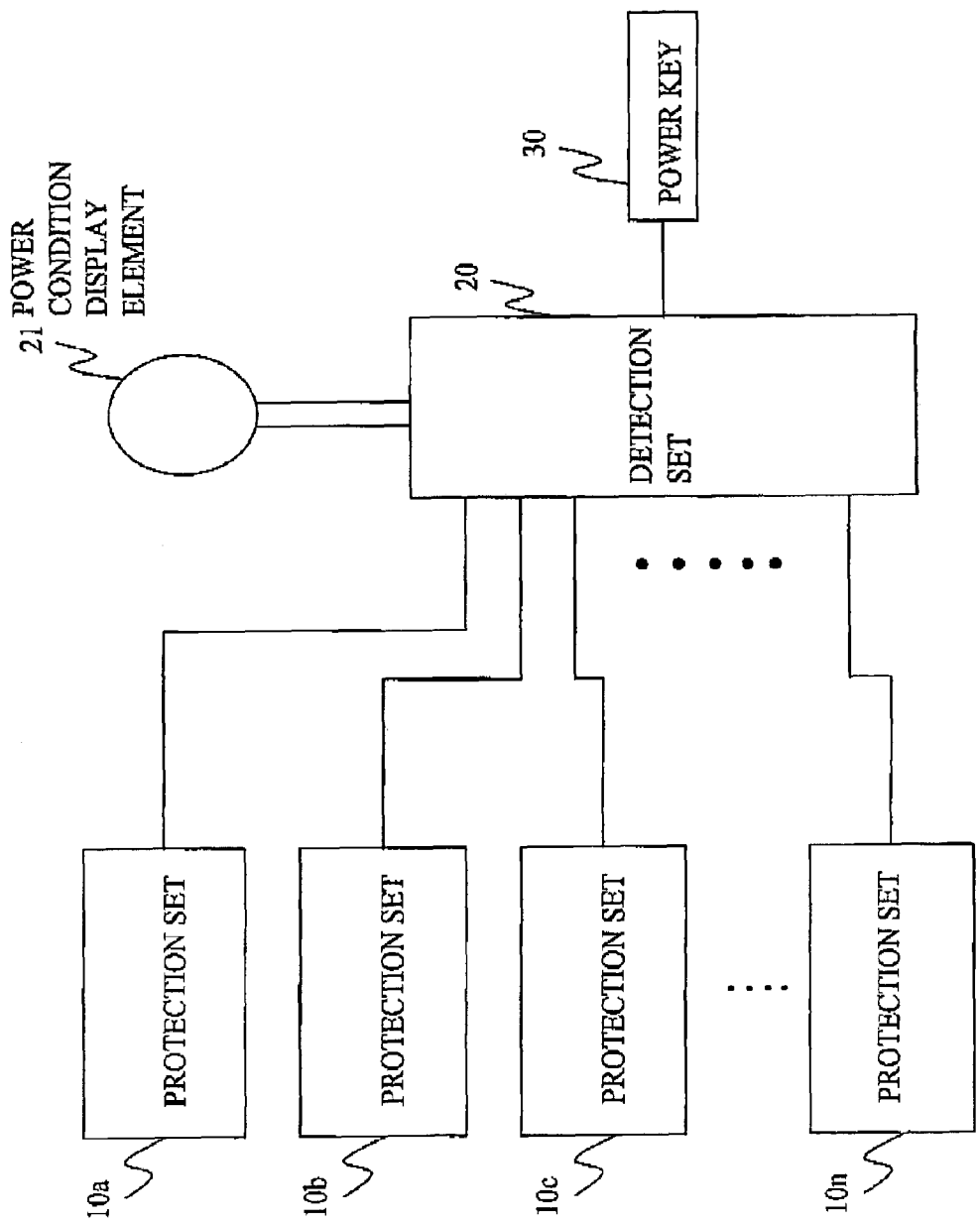
FIG. 3 illustrates, in block diagram form, the use of a device for detecting and protecting the power connection.

Please refer to FIG. 3 for the block diagram of the device being used to detect and protect the power connection.

The data processing system includes multiple protection sets 10a~10n, used to display the power connections between the sub-systems and interfaces, and the data processing power source. When a power connection error occurs, the working power of the data processing system is locked to prevent damage caused by incomplete power connections when the system is starting up. A user presses the power key (30) and the invention determines the status of the power connection of the sub-systems and the interfaces. If any of the power connections are incomplete, the protection sets 10a~10n transmit error signals to notify users. The protection sets 10a~10n also alert the condition to the detection set (20). If all sub-systems have good power connections and enter the start-up process of the data processing system, the power condition display element (21) displays a green light. If any of the sub-systems has an incomplete power connection, the power condition display element (21) displays a red light. Users can easily locate the problem spot by using the lights.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for detecting and protecting a power connection, which is located within a data processing system, detecting at least one sub-systems' power connection during system start up, comprising:
   at least one protecting unit, which is connected to the sub-system, for displaying current power connection and interrupting power when an error occurs, said at least one protecting unit further comprising:
   a display element, which is connected to stand-by power supply, for displaying a condition of the power connection of the sub-system;
   a programmable logic controller (PLC), which is used to control the power, for producing a switching signal when the sub-system's power connection is normal; and
   a switching element, which is connected to the programmable logic controller and the display element, for switching the display element's display of the condition of the power connection after receiving the switching signal; and
   a detecting unit, which is connected to the protecting unit, for detecting a condition of the protecting unit, starting up the data processing unit when each sub-systems' power connection is normal, and displaying a condition of the data processing system.

2. The device of claim 1, wherein said detecting unit futher comprises a condition display device for displaying the condition of the power connection of the sub-system.

3. The device claim 1, wherein said display element is a light emitting diode (LED).

4. The device claim 1, wherein said switching element is a transistor.

* * * * *